United States Patent [19]

Tilley et al.

[11] Patent Number: 4,497,785

[45] Date of Patent: Feb. 5, 1985

[54] PRODUCTION OF RARE EARTH COMPOUNDS

[75] Inventors: George L. Tilley, Costa Mesa; Allen W. Doty, Diamond Bar, both of Calif.

[73] Assignee: Union Oil Company of California, Los Angeles, Calif.

[21] Appl. No.: 553,436

[22] Filed: Nov. 18, 1983

[51] Int. Cl.³ .............................................. C01F 17/00
[52] U.S. Cl. .................. 423/263; 423/419 R
[58] Field of Search ............................ 423/263, 419 R

[56] References Cited

U.S. PATENT DOCUMENTS 3,401,008  9/1968  Head .................................... 423/263
3,446,574  5/1969  Head .
3,573,886  4/1971  Geotzinger et al. .
3,692,671  9/1972  Recht et al. .

FOREIGN PATENT DOCUMENTS 145853  1/1981  German Democratic Rep. ..................................... 423/263

715473  2/1980  U.S.S.R. ............................... 423/263

OTHER PUBLICATIONS

M. W. Woyski and R. E. Harris, "The Rare Earths and Rare-Earth Compounds," in I. M. Kolthoff and P. J. Elving (Eds.), *Treatise on Analytical Chemistry*, Part II, vol. 8, John Wiley & Sons, Inc., New York, 1963, p. 16.

*Primary Examiner*—Herbert T. Carter
*Attorney, Agent, or Firm*—Dean Sandford; Gregory F. Wirzbicki; Robert A. Franks

[57] ABSTRACT

A method for preparing high-density particles of rare earth carbonate comprises precipitating rare earth ions with aqueous carbonate or bicarbonate ions, in the presence of rare earth carbonate crystals, and separating the resulting precipitate. The method can be conducted to prepare individual batches or, alternatively, a continuous precipitation method can be used, wherein rare earth and carbonate or bicarbonate ions are mixed at a controlled rate to maintain an optimum pH condition. High-density rare earth oxide is obtained by calcining the precipitate.

42 Claims, 7 Drawing Figures

PRODUCTION OF RARE EARTH COMPOUNDS

BACKGROUND OF THE INVENTION

1. Field of the Invention

This invention relates to a method for preparing rare earth compounds. More particularly, the invention relates to the preparation of rare earth carbonates and, subsequently, conversion of the carbonates into high-density rare earth oxides.

2. Description of the Art

Rare earth compounds, once only scientific curiosities, are finding ever increasing industrial uses. By far the heaviest use of rare earth compounds is in the production of catalysts for organic reactions, particularly for the cracking of crude petroleum. Rare earth compounds are also used in the glass industry as polishing agents, refractive index modifiers, and colorants, as alloying agents in the metallurgical industry, in high purity forms for phosphors in color television picture tubes, and more recently, in the production of intermetallic compositions for the manufacture of high energy permanent magnets.

In particular, alloys of samarium and cobalt, having the compositions $SmCo_5$ and $Sm_2Co_{17}$, produce commercially useful permanent magnets having very high energy products. Samarium for these compositions is generally produced from samarium oxide by reduction at high temperatures. In one method, the samarium is reduced with an active rare earth metal, such as cerium, lanthanum, or misch metal, under a very high vacuum; elemental samarium sublimes, is collected, and later is alloyed with elemental cobalt in the proper proportions. Alternatively, the proper mixture of samarium oxide and cobalt oxide is reduced with calcium metal under an inert atmosphere to directly produce the alloy material.

Different users of rare earth compounds have different specifications for the properties of the materials which they purchase. For example, a producer of samarium-cobalt intermetallics will have productivity constrained by the volume capacity of the production equipment. By packing a larger quantity of samarium oxide into process vessels, a higher throughput can be obtained in a production run. Thus, samarium oxide having a high bulk density is very desirable.

Rare earth minerals typically contain a mixture of many different rare earth elements; solutions obtained from dissolving the rare earth portion of the ores in aqueous acids are subjected to liquid-liquid extraction procedures to separate the individual rare earths. The resulting rare earth solutions typically are treated with appropriate reagents for precipitating rare earth oxalates, carbonates, or hydroxides for recovery of the individual rare earth. The precipitate is then calcined at a temperature between about 900° C. and about 1,500° C., producing rare earth oxide.

Samarium oxide derived from samarium carbonate precipitated under non-specific conditions typically has a low bulk density near 1.0 grams/cc. The samarium oxide derived from samarium oxalate typically has an intermediate bulk density near 1.5 grams/cc, which is obtained at significantly higher reagent costs. However, there remains a need, particularly in alloy production, for a samarium oxide of even higher density specifications, preferably above 2.0 grams/cc. Of course, samarium oxide producers have a continuing need to reduce their operating costs.

Of the reagents commonly used for precipitating rare earths, oxalates (including oxalic acid) generally yield the most easily recovered precipitates. A substantial reduction in production costs could be achieved by precipitating rare earths with a less costly reagent, such as a carbonate or bicarbonate. However, as discussed by M. M. Woyski and R. E. Harris, "The Rare Earths and Rare Earth Compounds" in I. M. Kolthoff and P. J. Elving (Ed.). *Treatise on Analytical Chemistry, Part II, Volume 8*, John Wiley and Sons, Inc., New York, 1963, at page 16, the normal precipitation technique for rare earth carbonates yields slimy, relatively unfilterable solids.

In view of the foregoing, it is an object of this invention to provide a method for preparing high-density rare earth oxides.

It is a further object of the invention to provide a method for preparing high-density rare earth oxides, using relatively inexpensive reagents.

A further object of the invention is to provide a method for precipitating rare earth carbonates which can readily be separated from the mother liquor.

These and other objects will appear to those skilled in the art, from consideration of the following description and claims.

SUMMARY OF THE INVENTION

In accordance with the invention, high-density rare earth carbonate particles are prepared by admixing an aqueous solution containing rare earth ions and an aqueous solution containing bicarbonate or carbonate ions, in the presence of added rare earth carbonate crystals, and separating rare earth carbonate precipitate from the aqueous solution. High-density rare earth oxide can be obtained by calcining the precipitate. The method of the invention can be conducted to prepare individual batches or, alternatively, using a continuous precipitation method, in which rare earth ions and bicarbonate or carbonate ions are mixed at a controlled rate to maintain an optimum pH condition.

For a batch processing method, increased product densities are obtained by using a portion of rare earth carbonate prepared in a particular batch as the added crystals in successive batches; the density reaches a maximum level after added crystals have been used in at least about three successive batches.

DESCRIPTION OF THE INVENTION

As used herein, the term "rare earth" means yttrium and the lanthanide series of elements, including elements having the atomic numbers 39 and 57 through 71.

This invention is directed to a method for preparing high-density rare earth compounds, by admixing, in the presence of added crystals of a rare earth carbonate, an aqueous solution of the rare earth ions and an aqueous solution of bicarbonate or carbonate ions. A high-density rare earth carbonate will precipitate, and can be separated readily from the aqueous solution. High-density rare earth oxide can be prepared by calcining the separated precipitate.

The method is to be distinguished from the well-known technique of "seeding" or "nucleation" in which a foreign substance is introduced into a supersaturated solution, providing a site upon which a crystal of the solute can begin to form. Such a technique actually is a method for initiating crystal formation.

In contrast, the added rare earth carbonate crystals of the present invention appear to function as "templates" for the formation of precipitates having particles with high densities. No difficulty is encountered in causing precipitates to form when solutions of rare earth ions and bicarbonate or carbonate ions are mixed; the precipitate will be produced extremely rapidly whether or not rare earth carbonate crystals are initially present. However, it has been discovered that, when such crystals are initially present, the precipitate has an unexpectedly higher density and is readily separated from the aqueous solution. Without the crystals, the precipitate is very fluffy and difficult to isolate. Supersaturated solutions are not required for operation of the present invention.

For use in the method of this invention, rare earth ions in aqueous solutions may be obtained from process streams, such as aqueous phases from liquid-liquid extraction processes, or may be obtained by dissolving water soluble salts of the rare earths, such as the nitrates, chlorides, perchlorates, and the like. Other ions may also be present in the solutions, so long as they do not co-precipitate or become entrained during the conduct of the method, in such amounts as to contaminate the rare earth carbonate product to an unacceptable degree. The rare earth ions typically can have a concentration about 0.05M to about 1M in their aqueous solutions, more preferrably about 0.1M to about 0.3M.

Aqueous solutions containing bicarbonate or carbonate ions can be prepared by dissolving soluble bicarbonate or carbonate salts in water. Alternatively, solutions of carbon dioxide in water can be used, or carbonate for the method can be supplied by simply bubbling gaseous carbon dioxide into pressurized solutions containing the rare earth ions. When soluble salts are used to prepare the solution, bicarbonates and carbonates of the alkali metals or ammonia are preferred, primarily from a standpoint of reagent cost. If the method is used to prepare high-purity rare earth oxides, or if other considerations dictate the least possible presence of the extraneous cations in the product, it is preferred to use ammonium bicarbonate or carbonate, since the ammonium ions entrained in the rare earth carbonate will be volatilized upon calcining to form rare earth oxide. Bicarbonate or carbonate ion concentration in the aqueous solution is typically in the range about 0.05M to about 4M, more preferably about 1M to about 3M.

The added crystals of rare earth carbonate are normally prepared using the same rare earth which will be precipitated in the method of the invention, since they will be recovered with the precipitate. These crystals should be mixed with the rare earth ion solution, since they should be present prior to any admixing of the solutions, so that formation of the precipitate will occur in contact with the added crystals. Sufficiently vigorous agitation should be used to maintain a uniform suspension of the added crystals both before and during the conduct of the method, but it is important to avoid excessive agitation which breaks crystals. Typically the concentration of crystals in the rare earth solution, prior to admixing with bicarbonate or carbonate solution, will be about 1 gram per liter (g/l) to about 70 g/l, more preferably about 5 g/l to about 50 g/l.

The method of preparing crystals to be added affects rare earth carbonate product densities. It has been discovered that, when the method of this invention is conducted without initially using added rare earth carbonate crystals, and then conducted repeatedly, using portions of rare earth carbonate products from repetitive batches as added crystals for the next successive batches, the rare earth carbonate product density increases continuously during at least about 3 repetitions of the method. Preferably, at least about 6 repetitions will be used, after which the number of repetitions will normally not have a significant effect on rare earth carbonate product density. Although only a portion of product from a batch will be used as added crystals in the next batch, it is understood that a certain number of initially added crystals will persist from batch-to-batch, in ever diminishing numbers.

An alternative to the repetitive technique is to permit a rare earth carbonate precipitate to age in its mother liquor, before use as added crystals. This aging should be for a period of at least about 4 hours, and increases in effectiveness as the period increases, normally up to a period of about one day. After aging, the precipitate can be separated from its mother liquor and used as added crystals.

Another alternative is to use the continuous precipitation method, which will be described, infra, to directly prepare high-density rare earth carbonate which can be used as added crystals.

In accordance with a presently preferred embodiment of the invention, a typical batch production of rare earth carbonate proceeds as follows: the desired quantity of rare earth ion solution is charged to a mixing vessel, the solution pH is adjusted to a value above about 3, more preferably to a value about 3.5; the mixture is agitated and heated to a temperature which is preferably about 40° C. to about 60° C.; the desired amount of rare earth carbonate crystals is added; a solution of bicarbonate or carbonate ions is added to the agitated mixture until a pH about 6 to about 7 is obtained; and rare earth carbonate product is separated from the aqueous solution.

The pH of the rare earth ion solution should initially be sufficiently high that added crystals do not dissolve rapidly, but also should be below the pH at which rare earth carbonate begins to precipitate, about 4. A value of 3.5 is a reasonable compromise; at this pH, added crystals will slowly dissolve, so an expeditious commencement of precipitation with carbonate is advisable.

Figure 1:
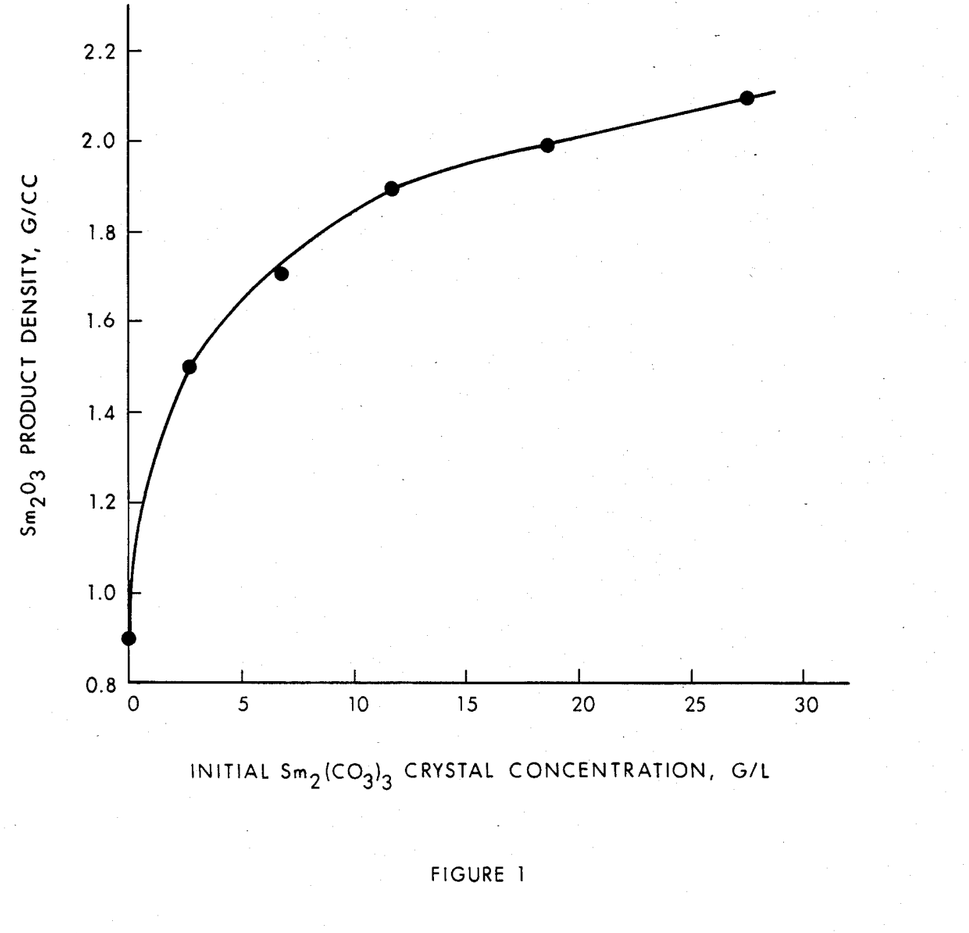
FIG. 1 is a graph showing samarium oxide product density versus initial samarium carbonate crystal concentration, for one embodiment of the invention.

FIG. 1 shows the effect of added crystals upon density of samarium oxide product, prepared by the method of the invention. As shown in the figure, when no added crystals are used, the samarium oxide product has a density of only 0.9 grams/cc. However, by using an initial concentration of about 30 g/l samarium carbonate crystals in the method of the invention, a samarium oxide having a density of 2.1 grams/cc is obtained. A similar graph should be prepared for each rare earth which is to be precipitated, for guidance in obtaining products having the desired density.

The temperature of precipitation has an effect upon product density. While the method may be conducted at temperatures between about 30° C. and about 90° C., it is presently preferred to conduct the precipitation of samarium carbonate at a temperature about 40° C. when added crystals of rare earth carbonate are present, and about 60° C. when the crystals are not added. This temperature effect is not pronounced and, therefore, it is not necessary to rigidly maintain these preferred temperatures.

Vigorous agitation during conduct of the method is necessary for satisfactory product densities. The rare earth carbonates produced by this invention are in the form of large, dense particles, as compared to the voluminous, slimy particles produced by other precipitation techniques. Without adequate agitation, these dense particles will not be maintained in suspension. It has been found that, when a substantial portion of particles present during the precipitation is not uniformly suspended in the aqueous solution, the particle size distribution plot for rare earth carbonate product shows multiple maxima, rather than the single-peaked, smooth curve obtained when all particles have been maintained in uniform suspension. This results in a lowered bulk density of the product.

The degree of agitation, in part, determines that rate at which the solution of bicarbonate or carbonate ions can be admixed with the rare earth ions. It is necessaary to introduce the carbonate more slowly when less agitation is possible, to avoid creating localized areas of high carbonate concentration which promote the formation of precipitates having lower densities and less desirable separation properties; in such instances it also is desirable to utilize solutions having lower concentrations. Actual flow rates will depend upon the geometry of the vessel in which admixing occurs, as well as the nature of the device for agitating vessel contents.

Upon cessation of the agitation, rare earth carbonate particles rapidly settle out of the aqueous suspension. For this reason, if it is desired to transfer slurry to conventional solid-liquid phase separation devices (such as filters, centrifuges, and the like) through pumps and piping, agitation should be maintained during the transfer.

As an alternative to batch precipitation, high-density rare earth carbonate can be prepared in a continuous-flow system. In such a system, an agitated mixing vessel, usually considerably smaller than that for batch processing, will be used and solutions will be continuously introduced into the vessel, in desired proportions. Temperatures and concentrations similar to those for batch precipitation are used in the continuous system, and total flows are preferably such that the concentration of solids in the vessel is maintained at approximately the same as the concentration of added crystals which would be used in a batch system for producing the desired product density.

It has been found that the pH of solution in the continuous flow vessel has an effect upon the final product density. For preparing samarium carbonate, particles having a density greater than about 2 grams/cc are obtained at pH values about 0.9 to about 5.3. Since not all of the samarium ions are precipitated at such a low pH, operation under this condition results in a somewhat more inefficient method. In general, pH values in the range about 4.5 to about 6 should be maintained for continuous operation. This pH is controlled by varying relative flow rates and concentrations of the rare earth ion solution and the bicarbonate or carbonate ion solution.

Rare earth carbonate precipitates of this invention have similar properties, whether prepared by batch methods or by continuous methods; slurry which is withdrawn from the mixing vessels can be handled in the sane manner for separation of the particles from the aqueous solution.

Separated rare earth carbonate can be converted to rare earth oxide by calcining, normally following a drying step. Suitable temperatures for calcining are in the range about 900° C. to about 1,500° C., more preferably about 1,000° C. to about 1,300° C. It has been found that increases in rare earth oxide product densities can be obtained by calcining at the higher temperatures in the stated range.

Figure 2A:
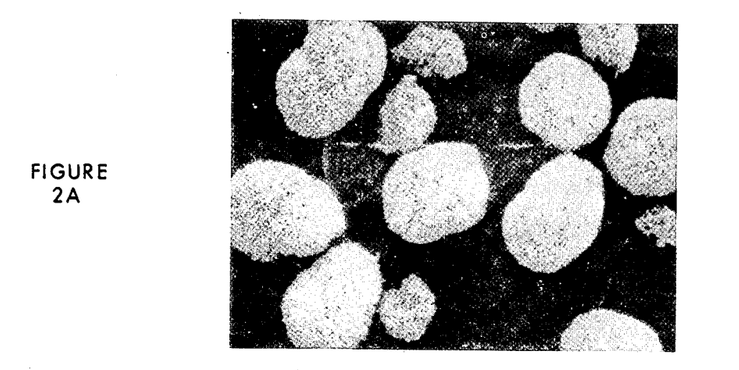
FIGS. 2A, 2B and 2C are electron micrographs showing particles of samarium carbonate prepared using one embodiment of the invention.
Figure 2B:
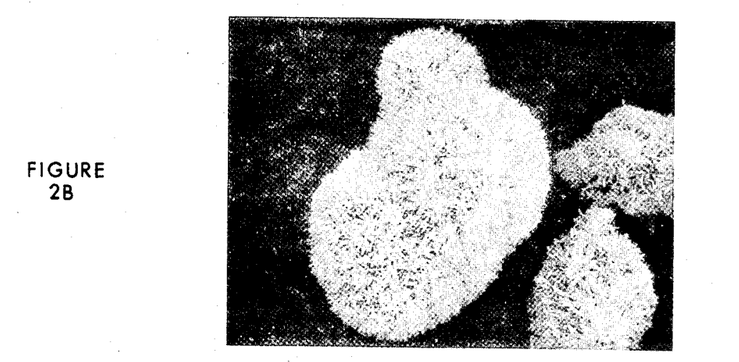
Figure 2C:
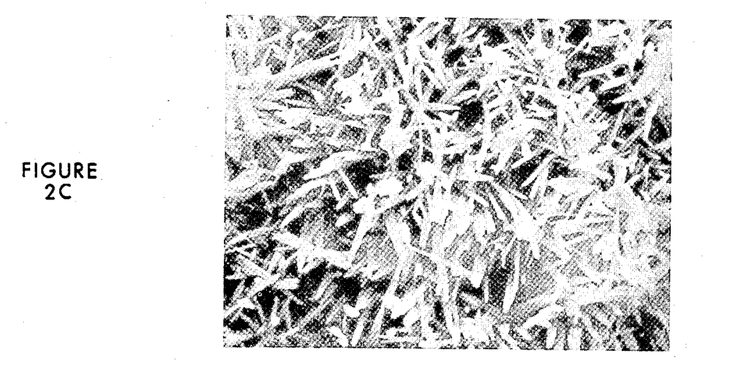

Samarium carbonate particles prepared by the method of the invention are more or less spherical in shape, as shown in FIGS. 2A, 2B, and 2C. FIG. 2A is an electron micrograph, taken at 500× magnification. Greater detail is shown in FIG. 2B, at 1000× magnification, and in FIG. 2C, at 5000× magnification. Carbonate material has a bulk density in the range about 0.7 to about 1.2 grams/cc and an average particle size in the range about 30 to about 70 microns.

Figure 3A:
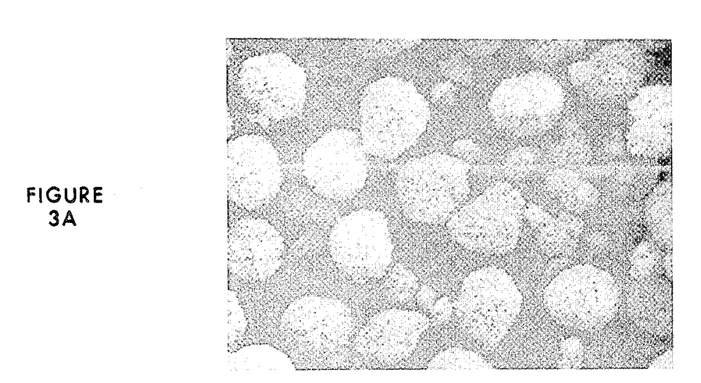
FIGS. 3A, 3B and 3C are electron micrographs showing particles of samarium oxide prepared using one embodiment of the invention.
Figure 3B:
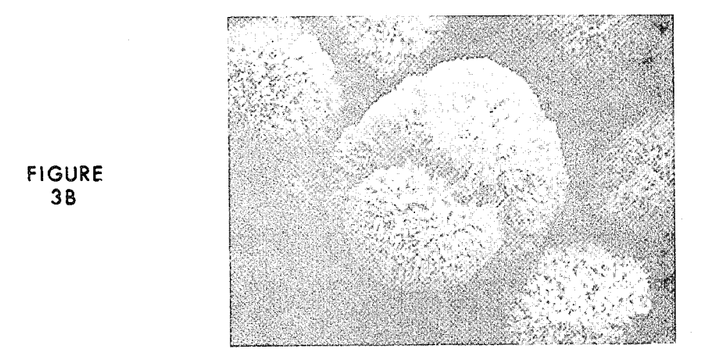
Figure 3C:
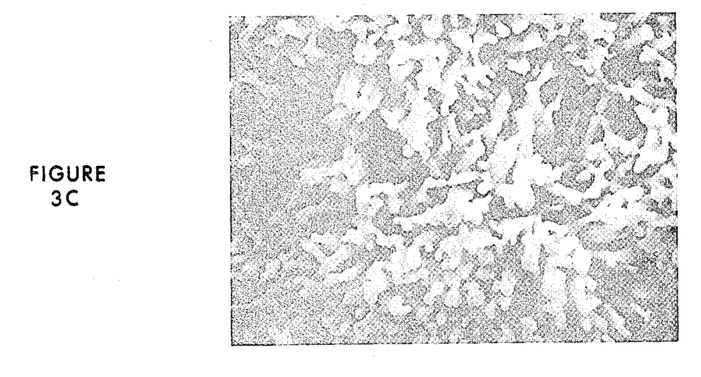

When the samarium carbonate is calcined, it retains the generally spherical shape, but the "spines" are somewhat more irregular and have the appearance of a possible slight melting. Samarium oxide, prepared by calcining samples of the material in FIGS. 2A, 2B, and 2C, is shown in FIGS. 3A, 3B and 3C. FIG. 3A is at 500× magnification, FIG. 3B is at 1000× magnification, and FIG. 3C is shown at 5000× magnification. Oxide material prepared by the method has a bulk density in the range about 1.8 to about 2.8 grams/cc, an average particle size in the range about 20 to about 45 microns, and a surface area about 0.5 meter$^2$/gram.

Values herein for particle size are as obtained using a Coulter Counter Particle Analyzer. Bulk densities are obtained using a modification of the DIN 53 194 procedure, wherein a weighed amount of sample in a 250 ml graduated cylinder is placed in a machine which reproducibly drops the cylinder a 3 millimeter distance, about 150 times per minute. After 1,250 drops, the surface of the sample is leveled, without compressing the sample, and the cylinder is again subjected to 1,250 drops. Volume of the sample is read from the cylinder and density is obtained from dividing the sample weight by sample volume. Surface area measurements are obtained by a standard BET technique.

The invention is further illustrated by the following examples, which are illustrative of various aspects of the invention and are not intended as limiting the scope of the invention as defined by the appended claims.

EXAMPLE I

The effect of added rare earth carbonate crystal concentration upon product density is shown in this example.

Initial crystals are prepared by placing 1 liter of a 30 g/l samarium nitrate solution (in 1N nitric acid) in a beaker, adjusting the pH to about 3, heating the solution to about 40° C., and adding, with stirring, a 2M ammonium bicarbonate solution dropwise (over a period of about 90 minutes) until a pH of about 6 is obtained. Precipitate is allowed to settle while the mixture cools to room temperature, over about one hour. After separation by filtration, the precipitate is dried overnight at about 100° F. A portion of the dried precipitate is calcined at 1200° C., producing samarium oxide having a density of 0.90 g/cc.

Crystals so prepared are used in subsequent tests to determine the effect of initial crystal concentration on product density. In each set of results, as shown in Table 1, the first sequential batch contains the indicated amount of crystals, obtained from the preparation described above. All sequential batches, after the first, contain the indicated concentration of added crystals, but obtained from the immediately preceding batch.

For each set, crystals are added immediately prior to commencing the ammonium bicarbonate solution addition, but the procedure is otherwise consistent with that described above for preparation of the initial crystals. Samples of dried samarium carbonate and calcined samarium oxide from each batch are used for density measurements, as reported in the table.

These data show that product densities are increased as the amount of initially present added crystals is increased, and also show that using crystals produced in a batch as added crystals for successive batches results in increasing product densities.

TABLE I

| Added Crystals g/l $Sm_2(CO_3)_3$ | Sequential Batch Number | $Sm_2(CO_3)_3$ Density, g/cc | $Sm_2O_3$ Density, g/cc |
|---|---|---|---|
| 6.9 | 1 | 0.54 | 1.30 |
|  | 2 | 0.60 | 1.51 |
|  | 3 | 0.54 | 1.46 |
|  | 4 | 0.64 | 1.70 |
|  | 5 | 0.65 | 1.72 |
|  | 6 | 0.67 | 1.82 |
|  | 7 | 0.62 | 1.63 |
|  | 8 | 0.60 | 1.69 |
|  | 9 | 0.60 | 1.71 |
| 11.7 | 1 | 0.69 | 1.48 |
|  | 2 | 0.71 | 1.80 |
|  | 3 | 0.70 | 1.78 |
|  | 4 | 0.68 | 1.94 |
|  | 5 | 0.68 | 1.90 |
|  | 6 | 0.68 | 1.82 |
|  | 7 | 0.74 | 1.98 |
| 18.6 | 1 | 0.70 | 1.40 |
|  | 2 | 0.78 | 1.72 |
|  | 3 | 0.82 | 1.93 |
|  | 4 | 0.81 | 2.13 |
|  | 5 | 0.81 | 2.04 |
|  | 6 | 0.83 | 1.98 |
|  | 7 | 0.80 | 2.02 |
| 27.6 | 1 | 0.59 | 1.43 |
|  | 2 | 0.70 | 1.68 |
|  | 3 | 0.82 | 1.92 |
|  | 4 | 0.86 | 2.11 |
|  | 5 | 0.87 | 2.16 |
|  | 6 | 0.85 | 2.10 |
|  | 7 | 0.91 | 2.06 |
|  | 8 | 0.89 | 2.12 |

EXAMPLE II

An experiment is performed to demonstrate the effect of aged added crystals on rare earth product density.

The procedure of the preceding example, for preparing "initial crystals," is followed, except that the crystals are not separated from their mother liquor. Samples are taken immediately after conclusion of the preparation (day "0") and at approximately 24 hour intervals thereafter; the samples are filtered, dried, and a portion of each is calcined. Densities are determined on both the samarium carbonate and the samarium oxide, as shown in Table 2.

TABLE 2

| Day | Density, grams/cc | |
|---|---|---|
|  | $Sm_2(CO_3)_3$ | $Sm_2O_3$ |
| 0 | 0.456 | 1.08 |
| 1 | 0.512 | 1.19 |
| 2 | 0.483 | 1.17 |
| 3 | 0.502 | 1.22 |
| 4 | 0.488 | 1.23 |

A portion of crystals aged four days is used as added crystals in a preparative method following the procedure for the sequential batches in the preceding example; crystals are added to obtain a concentration of 25 to 30 g/l. For comparison, another batch of crystals is prepared, but not aged in the mother liquor, and used to produce four sequential batches of samarium carbonate. Densities of carbonate and oxide products from these preparations are as shown in Table 3.

TABLE 3

| Batch | Density, grams/cc | | | |
|---|---|---|---|---|
|  | Unaged Crystals | | Aged Crystals | |
|  | $Sm_2(CO_3)_3$ | $Sm_2O_3$ | $Sm_2(CO_3)_3$ | $Sm_2O_3$ |
| 1 | 0.56 | 1.16 | 0.63 | 1.44 |
| 2 | 0.66 | 1.32 |  |  |
| 3 | 0.73 | 1.58 |  |  |
| 4 | 0.87 | 1.83 |  |  |

Rare earth carbonate crystals increase in density upon aging in their mother liquor. Further, by using aged material as "added crystals" in the method of the invention, the densification effect in sequential batches is accelerated.

EXAMPLE III

Sequential batch preparations, as in Example I, are repeated at 60° C. to demonstrate the effect of precipitation temperature on product density. Results are as shown in Table 4.

TABLE 4

| Added Crystals, g/l $Sm_2(CO_3)_3$ | Sequential Batch Number | $Sm_2(CO_3)_3$ Density, g/cc | $Sm_2O_3$ Density, g/cc |
|---|---|---|---|
| 6.9 | 1 | .54 | 1.03 |
|  | 2 | .48 | 1.13 |
|  | 3 | .53 | 1.33 |
|  | 4 | .53 | 1.48 |
|  | 5 | .57 | 1.43 |
|  | 6 | — | 1.46 |
|  | 7 | — | 1.42 |
| 18.6 | 1 | .47 | 0.90 |
|  | 2 | .58 | 1.16 |
|  | 3 | .64 | 1.35 |
|  | 4 | .68 | 1.49 |
|  | 5 | .62 | 1.44 |
|  | 6 | — | 1.55 |
|  | 7 | — | 1.61 |

When these results are compared with those of Table 1, obtained at 40° C., it is seen that the increased precipitation temperature yields a generally lower product density.

EXAMPLE IV

Larger-scale batch production is demonstrated in a vessel having a capacity of about 5 gallons. The vessel has a cylindrical upper portion measuring about 11.5 inches in diameter and 13 inches in length, with a truncated 90° conic section, about 1.75 inches long, attached to the cylinder bottom. An opening is provided in the center of the conic section, for removing materials from the vessel. Agitation of the vessel contents is accomplished by a six-inch diameter, motor-driven turbine impeller, approximately 3 inches above the bottom of the vessel, which directs slurry upward. Carbonate solution is added to the vessel through a distributor ring, mounted at the bottom of the cylindrical portion of the vessel, around the inner circumference of the vessel, and provided with five orifices which direct solution upward and inward.

In the preparative method, 10 liters of a solution containing 19.8 g/l samarium in dilute nitric acid are charged to the vessel. The solution pH is adjusted to about 3 with ammonium bicarbonate, heat is applied to obtain a solution temperature of about 60° C., and about 200 grams of samarium carbonate are added. The impeller is started and a 2M solution of ammonium bicarbonate is pumped through the distributor, at a rate of about 49 ml/minute, until a pH of about 6 is obtained. The addition of ammonium bicarbonate is stopped and, under continued vessel agitation, the vessel is drained to leave a total slurry volume of about 5 liters. Agitation is stopped, the crystals are allowed to settle, and clear solution is decanted to leave a proper amount of crystals for the next batch preparation. After adjusting the pH of slurry in the vessel to a value less than about 5, samarium solution for the next batch is added. All batches after the first are precipitated at a temperature of 40° C.

Product from each of eight successive runs is filtered and dried, and a portion of each product is calcined. Densities are as shown in Table 5.

TABLE 5

| Batch No. | $Sm_2O_3$ Density, g/cc |
| --- | --- |
| 1 | 1.16 |
| 2 | 1.32 |
| 3 | 1.58 |
| 4 | 1.83 |
| 5 | 2.24 |
| 6 | 2.29 |
| 7 | 2.24 |
| 8 | 2.35 |

Product from batch number 8 is examined, using a scanning electron microscope. FIGS. 2A, 2B and 2C show samarium carbonate particles obtained. FIGS. 3A, 3B and 3C show samarium oxide obtained from calcining batch number 8.

EXAMPLE V

The method of the invention is operated in a continuous mode. A 4-liter stirred vessel, provided with an outlet near the bottom, is filled to about half its capacity with 0.5M ammonium nitrate solution, heated to about 40° C., and charged with samarium carbonate to form a crystal concentration of about 23 g/l. Through a two-headed metering pump, individual flows of a samarium nitrate solution (from a commercial solvent-extraction process, containing about 20 g/l samarium) and a 2M ammonium bicarbonate solution are introduced into the vessel. Samarium solution is pumped at a rate of about 5.8 ml/minute and the carbonate solution flow rate is adjusted, as needed, to maintain a predetermined pH level in the vessel. Typical carbonate solution flow is about 30 to 50 percent of the samarium flow rate.

Product is removed at one-hour intervals, following starting of the metering pump, by draining the vessel approximately to its initial slurry level. Equilibrium in the vessel typically occurs within about the first hour of operation. Each product sample is filtered and dried, and a portion is calcined to form samarium oxide. A portion of the filtrate is analyzed to determine the unreacted samarium ion concentration.

Results are obtained as in Table 6.

TABLE 6

| Run | pH | Density, g/cc | | Filtrate Sm, mg/l |
| --- | --- | --- | --- | --- |
| | | $Sm_2(CO_3)_3$ | $Sm_2O_3$ | |
| 1 | 4.9–5.1 | 0.73 | 2.07 | 390 |
| | | 0.87 | 2.55 | |
| | | 1.03 | 2.56 | |
| | | 1.00 | 2.68 | |
| 2 | 5.0–5.1 | 0.79 | 2.33 | 24 |
| | | 0.77 | 2.39 | |
| | | 0.81 | 2.14 | |
| | | 0.82 | 2.04 | |
| | | 0.88 | 2.06 | |
| | | 0.92 | 2.19 | |
| 3 | 5.0–5.1 | 0.92 | 2.60 | |
| | | 0.82 | 2.43 | |
| | | 0.85 | 2.44 | |
| | | 0.88 | 2.50 | |
| | | 0.94 | 2.56 | |
| | | 0.74 | 2.26 | |
| | | 0.88 | 2.50 | |
| | | 0.83 | 2.39 | |
| 4 | 5.2–5.3 | 0.72 | 2.26 | 1.1 |
| | | 0.74 | 2.34 | |
| | | 0.71 | 2.28 | |
| | | 0.71 | 2.18 | |
| | | 0.65 | 2.07 | |
| | | 0.67 | 2.01 | |
| 5 | 5.5–5.6 | 0.47 | 1.78 | 7.8 |
| | | 0.56 | 1.81 | |
| | | 0.56 | 1.80 | |
| | | 0.60 | 2.03 | |
| | | 0.71 | 2.05 | |
| | | 0.73 | 1.99 | |
| | | 0.71 | 1.82 | |
| 6 | 5.5–5.6 | 0.56 | 1.66 | <1 |
| | | 0.55 | 1.65 | |
| | | 0.51 | 1.58 | |
| | | 0.51 | 1.66 | |
| | | 0.54 | 1.60 | |
| | | 0.55 | 1.71 | |

In general, the results show that highest product densities are obtained at lower values of pH during precipitation. However, low pH also gives a more incomplete precipitation of samarium.

EXAMPLE VI

A composite of samarium carbonate products from several large-scale batch preparations (as in Example IV, supra) is dried and samples are calcined at various temperatures. The carbonate, having a density of 0.956 g/cc, yields oxide having densities as in Table 7.

TABLE 7

| Calcine Temperature, °C. | Density g/cc |
| --- | --- |
| 1000 | 1.63 |
| 1100 | 2.01 |
| 1230 | 2.39 |

These densities indicate that calcining temperature can be altered to change the properties of rare earth oxide products.

Various embodiments and modifications of this invention have been described in the foregoing discussion and examples, and further modifications will be apparent to those skilled in the art. Such modifications are included within the scope of the invention, as defined by the following claims.

What is claimed is:

1. A method for preparing high-density rare earth carbonate which comprises admixing, with agitation, an aqueous solution containing rare earth ions and an aqueous solution containing bicarbonate or carbonate ions, in the presence of added rare earth carbonate crystals, and separating rare earth carbonate from the aqueous solution.

2. The method defined in claim 1, wherein the pH of the solution of rare earth ions is adjusted to a value greater than about 3.

3. The method defined in claim 1, wherein rare earth carbonate crystals are added to the solution of rare earth ions, prior to admixing with the solution of bicarbonate or carbonate ions.

4. The method defined in claim 3, wherein added rare earth carbonate crystals have a concentration about 1 to about 70 grams per liter in the solution of rare earth ions.

5. The method defined in claim 1, wherein the concentration of rare earth ions in their aqueous solution is about 0.05 Molar to about 1 Molar.

6. The method defined in claim 1, wherein the concentration of bicarbonate or carbonate ions in their aqueous solution is about 0.05 Molar to about 4 Molar.

7. The method defined in claim 1, wherein temperatures about 30° C. to about 90° C. are maintained while solutions are admixed.

8. The method defined in claim 1, wherein added rare earth carbonate crystals have been prepared by the method of claim 1.

9. The method defined in claim 8, wherein a portion of the crystals has been present during one or more previous repetitions of the method of claim 1.

10. The method defined in claim 9, wherein the portion has been present during at least 3 repetitions.

11. The method defined in claim 1, wherein added rare earth carbonate crystals have been prepared by a method comprising admixing an aqueous solution containing rare earth ions and an aqueous solution containing bicarbonate or carbonate ions, while maintaining temperature about 30° C. to about 90° C., aging the admixture for at least about 4 hours, and separating rare earth carbonate from the aqueous solution.

12. The method defined in claim 1, wherein individual flows of rare earth ion solution and bicarbonate or carbonate ion solution are simultaneously introduced into a mixing vessel, at flow rates such that pH values about 4.5 to about 6 are maintained in the vessel during admixing.

13. The method defined in claim 1, wherein the rare earth is samarium.

14. A method for preparing high-density rare earth oxide which comprises admixing, with agitation, an aqueous solution containing rare earth ions and an aqueous solution containing bicarbonate or carbonate ions, in the presence of added rare earth carbonate crystals, separating rare earth carbonate from the aqueous solution, and calcining the rare earth carbonate to form rare earth oxide.

15. The method defined in claim 14, wherein the pH of the solution of rare earth ions is adjusted to a value greater than about 3 prior to admixing.

16. The method defined in claim 14, wherein rare earth carbonate crystals are added to the solution of rare earth ions, prior to admixing with the solution of bicarbonate or carbonate ions.

17. The method defined in claim 16, wherein added rare earth carbonate crystals have a concentration about 1 to about 70 grams per liter in the solution of rare earth ions.

18. The method defined in claim 14, wherein the concentration of rare earth ions in their aqueous solution is about 0.05 Molar to about 1 Molar.

19. The method defined in claim 14, wherein the concentration of bicarbonate or carbonate ions in their aqueous solution is about 0.05 Molar to about 4 Molar.

20. The method defined in claim 14, wherein temperatures about 30° C. to about 90° C. are maintained while solutions are admixed.

21. The method defined in claim 14, wherein added rare earth carbonate crystals have been prepared by the method of claim 14.

22. The method defined in claim 21, wherein a portion of the crystals has been present during one or more previous repetitions of the method of claim 14.

23. The method defined in claim 22, wherein the portion has been present during at least 3 repetitions.

24. The method defined in claim 14, wherein added rare earth carbonate crystals have been prepared by a method comprising admixing an aqueous solution containing rare earth ions and an aqueous solution containing bicarbonate or carbonate ions, while maintaining temperatures about 30° C. to about 90° C., aging the admixture for at least about 4 hours, and separating rare earth carbonate from the aqueous solution.

25. The method defined in claim 14, wherein individual flows of rare earth ion solution and bicarbonate or carbonate ion solution are simultaneously introduced into a mixing vessel, at flow rates such that pH values about 4.5 to about 6 are maintained in the vessel during admixing.

26. The method defined in claim 14, wherein the rare earth is samarium.

27. The method defined in claim 14, wherein calcining is at temperatures about 900° C. to about 1500° C.

28. A method for preparing high-density samarium oxide which comprises admixing, with agitation, an aqueous solution containing samarium ions and an aqueous solution containing bicarbonate or carbonate ions, in the presence of added samarium carbonate crystals, separating samarium carbonate from the aqueous solution, and calcining samarium carbonate to form samarium oxide.

29. The method defined in claim 28, wherein the pH of the solution containing samarium ions is adjusted to a value about 3 to about 4, and samarium carbonate crystals are added, prior to admixing with the solution containing bicarbonate or carbonate ions.

30. The method defined in claim 29, wherein added rare earth crystals have a concentration about 1 to about 70 grams per liter in the solution containing samarium ions.

31. The method defined in claim 28, wherein the concentration of samarium ions in their aqueous solution is about 0.05 Molar to about 1 Molar.

32. The method defined in claim 28, wherein the concentration of bicarbonate or carbonate ions in their aqueous solution is about 0.05 Molar to about 4 Molar.

33. The method defined in claim 28, wherein temperatures about 30° C. to about 90° C. are maintained while solutions are admixed.

34. The method defined in claim 28, wherein added samarium carbonate crystals have been prepared by the method of claim 28.

35. The method defined in claim 34, wherein a portion of the crystals has been present during one or more previous repetitions of the method of claim 28.

36. The method defined in claim 35, wherein the portion has been present during at least 3 repetitions.

37. The method defined in claim 34, wherein, in the preparation of added crystals, the samarium carbonate is aged in its mother liquor for at least about 4 hours, prior to separating from the aqueous solution.

38. The method defined in claim 28, wherein individual flows of samarium ion solution and bicarbonate or carbonate ion solution are simultaneously introduced into a mixing vessel, at flow rates such that pH values about 4.5 to about 6 are maintained in the vessel during admixing.

39. The method defined in claim 38, wherein pH values about 4.9 to about 5.3 are maintained.

40. The method defined in claim 28, wherein calcining is at temperatures about 900° C. to about 1500° C.

41. The method defined in claim 40, wherein calcining is at temperatures greater than about 1000° C.

42. A method for preparing high-density samarium oxide, comprising the steps of:
 (a) adjusting the pH of an aqueous solution containing samarium ions to a value about 3 to about 4;
 (b) adding samarium carbonate crystals to the samarium ion solution, in such amount as to form a slurry containing about 5 to about 50 grams per liter crystals;
 (c) while maintaining temperatures about 30° C. to about 90° C. and agitating the slurry, admixing the slurry with sufficient aqueous solution containing bicarbonate or carbonate ions to produce a pH about 6;
 (d) separating samarium carbonate from the aqueous solution; and
 (e) calcining the separated samarium carbonate at temperature about 1000° C. to about 1300° C.

* * * * *